United States Patent [19]

Hille et al.

[11] Patent Number: 5,830,830

[45] Date of Patent: Nov. 3, 1998

[54] USE OF ACETAL-CONTAINING MIXTURES

[75] Inventors: Martin Hille, Liederbach; Heinz Wittkus, Frankfurt am Main; Frank Weinelt, Burgkirchen, all of Germany

[73] Assignee: Clariant GmbH, Germany

[21] Appl. No.: 527,655

[22] Filed: Sep. 13, 1995

[30] Foreign Application Priority Data

Sep. 15, 1994 [DE] Germany .................. 44 32 841.9

[51] Int. Cl.$^6$ .................................. C09K 7/00
[52] U.S. Cl. ................ 507/136; 507/138; 507/139
[58] Field of Search .................. 507/136, 138, 507/139

[56] References Cited

U.S. PATENT DOCUMENTS

| | | | |
|---|---|---|---|
| 4,888,121 | 12/1989 | Dill et al. | 507/241 |
| 5,194,422 | 3/1993 | Mueller et al. | 507/136 |
| 5,232,910 | 8/1993 | Mueller et al. | 507/138 |
| 5,252,554 | 10/1993 | Mueller et al. | 507/138 |
| 5,318,956 | 6/1994 | Mueller et al. | 507/139 |
| 5,348,938 | 9/1994 | Mueller et al. | 507/139 |
| 5,403,822 | 4/1995 | Mueller et al. | 507/138 |
| 5,441,927 | 8/1995 | Mueller et al. | 507/138 |

FOREIGN PATENT DOCUMENTS

| | | |
|---|---|---|
| 2068129 | 11/1992 | Canada . |
| 0 386 636 | 9/1990 | European Pat. Off. . |
| 0 391 252 | 10/1990 | European Pat. Off. . |
| 0 512 501 | 11/1992 | European Pat. Off. . |
| 91/19771 | 12/1991 | WIPO . |
| 93/16145 | 8/1993 | WIPO . |

*Primary Examiner*—C. H. Kelly
*Attorney, Agent, or Firm*—Connolly & Hutz

[57] ABSTRACT

The invention relates to mixtures comprising acetals and oleophilic alcohols and/or oleophilic esters which are suitable for the preparation of inverted emulsion drilling muds and emulsion drilling muds. They completely or partly replace here the base oils, diesel oil, purified diesel oil, white oil, olefins and alkylbenzenes known to date.

The invention furthermore relates to the use of the inverted emulsion drilling mud and emulsion drilling mud as claimed in claim 10.

19 Claims, No Drawings

USE OF ACETAL-CONTAINING MIXTURES

BACKGROUND OF THE INVENTION

About 10–20% of all boreholes worldwide are sunk with inverted emulsion muds. Many water-based drilling muds which are called emulsion drilling muds have oils added to them to improve the properties. A change is made to inverted emulsion muds when water-based drilling muds have reached the limits of their performance. Inverted emulsion muds are more advantageous in stable, water-sensitive formations and in inclined boreholes. They are stable up to very high temperatures and provide excellent corrosion protection. Disadvantages are the higher price, the greater risk if gas reservoirs are bored through, the more difficult handling for the team at the tower and the greater environmental problems. For inverted emulsion muds with a continuous hydrocarbon phase, fractions of crude oil such as diesel oil, purified diesel oil with less than 0.5% of aromatics (clean oil), white oils or secondary products such as olefins or alkylbenzenes are employed. These are pure hydrocarbons which are not degraded under the anaerobic conditions in the drilling sludge on the seabed. The inverted emulsion drilling muds comprise reagents which, in addition to stabilizing the emulsion, must ensure wetting of all the solids in the mud and of the drillings bored with oil. The drillings separated off above-ground are wetted with oil and must be disposed of separately. Considerable environmentally damaging effects occur offshore if the drillings or volumes of mud get into the sea. Drilling sludge and the heavy mud sink to the seabed and partly flow with the tides and sea currents to the coasts, for example mud flats. By this route and over its area of spread, the sludge kills all life on the seabed by hydrophobicization. Diesel oil was originally the basis for inverted emulsion drilling muds. More highly purified, less toxic diesel oils with less than 0.5% of aromatics, and white oils, olefins and alkylbenzenes have recently been used.

All of these hydrocarbons contain no oxygen and are not degraded in the oil-wetted drilling sludge on the seabed. The lower toxicity is almost insignificant, because the effect which damages the environment is caused by the combination of hydrocarbons which cannot be degraded anaerobically on the seabed and organic reagents which are required for formulation of the inverted emulsion drilling muds. These reagents are necessary to keep all the solids of the drilling mud, such as bentonite, barite and drillings, wetted with oil.

Compounds such as alcohols which are disclosed in EP-A-0398112, esters which are disclosed in EP-A-0398113 and ethers EP-A-0391251 have been proposed and tested as base oils of better biological degradability. These products represent progress in respect of toxicity and biological degradability, but the requirements of a base oil in respect of setting point, viscosity, hydrolyzability and odor limit their use considerably.

The use of biologically degradable triglycerides of vegetable and animal origin in oil-based drilling muds is explained in U.S. Pat. No. 4 374 737 and U.S. Pat. No. 4 481 121. The use of simple ester oils in inverted emulsion muds for deep boreholes down to crude oil and natural gas is described in DE-A-38 42 659 and DE-A-38 42 703.

The viscosity and setting point of natural fats and oils depend on the acid components in the triglycerides. The possible technical uses are thus limited. These properties can be established more flexibly, although less economically, with monoesters based on fatty acids and alcohols.

Higher alcohols have also been proposed according to EP-A-0 391 252 for oil-based drilling muds.

The high setting point of linear alcohols and the poor biological degradability of branched alcohols limit their use as an environment-friendly mineral oil substitute. Higher alcohols which are still just somewhat water-soluble are eliminated for use in offshore muds because of their high toxicity to fish.

The disadvantage of ester-based inverted emulsion muds is the lack of stability of these compounds in the alkaline range. The amount added is generally 4–6 lb/bbl of lime ($CaOH_2$) to achieve a good stability of inverted emulsion muds. This amount offers the necessary buffer reserve and mud stability against penetrating acid gases, such as carbon dioxide and, in particular, hydrogen sulfide. Only 2 lb/bbl of lime and less are expressly recommended for the ester muds in order to keep the hydrolysis, which increases in particular with increasing temperature, within limits.

With hydrolysis, the composition of the oleophilic phase changes; lime soaps and free alcohols increasingly occur, the lime soaps leading to very stable waxy deposits in the tower and the alcohols, which are usually highly toxic to fish, rendering discharge of unpurified drillings into the sea very problematic.

The cleavage components of the esters in particular have a very good biological degradability. On the seabed, they quickly use up the oxygen, the amount of which is in any case low, and form anaerobic zones in which, for example, $H_2S$ is also evolved, which kills all life there. This is serious environmental damage.

During operation in practice, and in particular by introduction of cement, troublesome thickening of the muds occurs, and this must be kept within limits by continuous topping up and additional additives. The amount of esters required as a basis for inverted emulsion muds thereby increases considerably, compared with mineral oil.

For all these reasons, inverted emulsion muds based on esters are suitable only for shallow and medium-depth boreholes.

EP-A-0 512 501 proposes acetals as a mineral oil substitute for inverted emulsion muds, emulsion muds, engine, gear and lubricating oils and metalworking, cooling, cooling lubricating and hydraulic liquids.

Acetals are extremely stable in the neutral and in particular in the alkaline range. Inverted emulsion muds based on acetals are superior to all water- and also oil-based muds when used in deeper boreholes, because it has proved easy to calculate their rheological properties at high temperatures in the borehole. Under these conditions, the plastic viscosity decreases, but the flow limits, the gel values and the viscosity at 6 rpm in a Fann rheometer remain constant, which results in an excellent discharge of the drillings even, in particular, in inclined boreholes (Paper No. 29425 of Society of Petroleum Engineers/International Association of Drilling Contractors).

With esters and in particular acetals, substances are now available which can be degraded anaerobically on the seabed and which minimize the environmentally damaging effect on the seabed because they severely limit spread and flow on the seabed by anaerobic degradation. When these products are employed, rapid recovery of the ecology of the seabed takes place after the end of drilling.

Acetals which have a relatively low viscosity and in particular a relatively low setting point can be prepared by combination of various aldehydes and alcohols.

SUMMARY OF THE INVENTION

It has now been found that acetals which have flash points above 60° C. and are suitable for emulsion and inverted emulsion drilling muds are generally good solvents for esters and alcohols. They can therefore be used to prepare mixtures with esters and/or alcohols which are homogeneous within wide ranges, have a good biological degradability, and have the required low viscosities for emulsions and inverted emulsions, the rheological profiles of which can be adapted to the borehole requirements.

The invention thus relates to mixtures comprising acetals and oleophilic alcohols and/or oleophilic esters which are suitable for the preparation of inverted emulsion drilling muds and emulsion drilling muds. They completely or partly replace here the base oils, diesel oil, purified diesel oil, white oil, olefins and alkylbenzenes known to date.

DESCRIPTION OF THE INVENTION

The invention thus relates to mixtures comprising acetals and oleophilic alcohols and/or oleophilic esters which are suitable for the preparation of inverted emulsion drilling muds and emulsion drilling muds. They completely or partly replace here the base oils, diesel oil, purified diesel oil, white oil, olefins and alkylbenzenes known to date.

With the mixtures of acetals with esters and/or alcohols, the positive properties of the acetal inverted emulsion mud, as a function of the mixing, are largely retained.

The hydrolysis of the esters is reduced drastically, and the heat stability is greatly improved compared with ester-based inverted emulsion muds.

The inventive mixture can comprise an acetal based on a monofunctional aldehyde having 1 to 25, in particular 1 to 10 carbon atoms and a monohydric alcohol having 1 to 25, in particular 4 to 20 carbon atoms. The acetal can be based on a aldehyde, in particular one having 2 to 10 carbon atoms, such as glyoxal, tartaric acid dialdehyde, succinic dialdehyde or maleic and fumaric acid dialdehyde, preferably glyoxal, and a monohydric alcohol having to 25, in particular 4 to 20 carbon atoms. The oleophilic alcohol can be a linear alcohol, branched alcohol, unsaturated alcohol and/or branched unsaturated alcohol. The oleophilic alcohol can have 8 to 25, in particular 10 to 16 carbon atoms. The oleophilic alcohol is preferably a linear alcohol having 10 to 16 carbon atoms. The oleophilic ester can be an ester based on a mon-, di- and/or trifunctional alcohol and $aC_1–C_{25}$-carboxylic acid. The oleophilic ester can also be an oleophilic ester oil of vegetable and/or animal origin.

The invention further relates to the use of the mixture for the preparation of an inverted emulsion drilling mud and/or emulsion drilling mud. The invention also relates to an inverted emulsion drilling mud and/or emulsion drilling mud comprising the inventive mixture.

Suitable acetals are acetals based on monofunctional aldehydes having 1 to 25, in particular 1 to 10 carbon atoms and monohydric alcohols having 1 to 25, in particular 4 to 20 carbon atoms. They can be branched or unbranched, saturated or unsaturated and aliphatic or aromatic. The acetals can also comprise a mixture which has been prepared from alcohols and/or aldehydes with various chains or with the same chain. Furthermore, acetals prepared from dialdehydes, in particular those having 2 to 10 carbon atoms, such as glyoxal, tartaric acid dialdehyde, succinic dialdehyde and maleic and fumaric acid dialdehyde, but preferably glyoxal, can also be employed with the alcohols mentioned. The preparation of the acetals is described in EP-A-0 512 501.

Suitable oleophilic alcohols are linear alcohols, branched alcohols, unsaturated alcohols and/or branched unsaturated alcohols. Preferred alcohols are those having 8 to 25, particularly preferably 10 to 16 carbon atoms. Linear alcohols having 10 to 16 carbon atoms are preferred in particular. The term oleophilic refers to alcohols of which the water-solubility at room temperature is less than 1% by weight, and in particular not more than 0.5% by weight. Suitable alcohols are, in particular, decanol, dodecanol, tetradecanol, coconut fatty alcohol, lauryl alcohol and α-methyldecanol. The alcohols are obtainable as commercial trade products.

Suitable oleophilic esters are esters based on mono-, di- and/or trifunctional alcohols and $C_1–C_{25}$-carboxylic acids. The monofunctional alcohols are alcohols having 8 to 25 carbon atoms, which can be linear, branched, unsaturated and/or aromatic.

The difunctional alcohols are alcohols having up to 18 carbon atoms, preferably 2 to 18 carbon atoms, which are optionally also in the form of polyglycol ethers having up to 6 ethylene- and/or propylenealkylene. Examples of difunctional alcohols are ethylene glycol, propylene glycol and butylene glycol, as well as dialkanolamines, such as diethanolamine. The trifunctional alcohols are alcohols having up to 6 carbon atoms, preferably 2 to 6 carbon atoms, for example glycerol and trialkanolamines, for example triethanolamine.

The abovementioned $C_1–C_{25}$-carboxylic acids include mono-, di- and/or trifunctional carboxylic acids, which are linear, branched, unsaturated and aromatic.

Examples of monofunctional carboxylic acids of natural origin are coconut fatty acid, stearic acid, oleic acid and tallow fatty acid.

Examples of difunctional carboxylic acids are oxalic acid, malonic acid, succinic acid and phthalic acid. An example of a trifunctional carboxylic acid is citric acid.

Triglycerides of vegetable and animal origin furthermore can also be used as oleophilic esters. Examples of triglycerides of vegetable origin are soybean oil, rapeseed oil, peanut oil, linseed oil, corn oil, rice oil, castor oil, coconut oil, palm kernel oil and olive oil. Examples of triglycerides of animal origin are whale and fish oil.

The oleophilic esters and ester oils listed are compounds which are obtainable as commercial trade products. All the esters of non-natural origin can be prepared from the corresponding alcohols and carboxylic acids by acid catalysis (P. Kaurer "Lehrbuch der Organischen Chemie" [Textbook of Organic Chemistry], page 233 et seq.). The term oleophilic means esters of which the water-solubility at room temperature is less than 1% by weight, and in particular not more than 0.5% by weight.

Quite specific requirements are imposed on the viscosity and setting point of the oleophilic phase of an emulsion or inverted emulsion for use as drilling mud. The properties must allow good pumping under conditions in practice, ie. the viscosity of the formulated mud should be not more than 50–80 mPas under normal conditions (20° C.).

The viscosity of the oleophilic phase should therefore not exceed 10 mPas, but a maximum of 25 mPas at 20° C., and the setting point should be at least below –10° C. Only thus can a pumpable mud be formulated under offshore conditions, for example in the North Sea after stand-stills. For drilling in tropical regions, the viscosities can be somewhat higher, for example 15–30 mPas, and the setting point can be up to +10° C.

The mixtures comprising acetal as well as oleophilic alcohol and/or oleophilic ester are usually present to the extent of at least 0.5% by weight as a component in inverted emulsion drilling muds and emulsion drilling muds. Where they partly or completely replace the prior art base oils or oil phase, they form up to 99.9% by weight of these liquids, with the exception of emulsion drilling muds, in which their content is not more than 50% by weight (the remainder being water).

Inverted emulsion drilling muds usually comprise, in the oleophilic phase (continuous phase), at least 5% by weight of acetal, preferably 5 to 99% by weight of acetal, and up to 95% by weight, preferably 1 to 95% by weight, of oleophilic alcohol and/or ester. The above data relates to the oleophilic phase.

The invention is explained in more detail with the aid of the following examples.

EXAMPLES

Table 1 shows esters and alcohols which do not meet the requirements of the oleophilic phase of inverted emulsion drilling muds in respect of viscosity and also setting point.

Table 2 shows examples of mixtures of acetals with esters and alcohols of Table 1.

The viscosities and setting points of the mixtures show how pure substances of Table 1 which do not meet the requirements of an oleophilic phase for inverted emulsion drilling muds form, with acetals, homogeneous, stable solutions which meet the properties required in respect of viscosity and setting point.

The values mentioned for the setting point and viscosity in the summary show the wide scope for use according to the invention of the mixtures.

Laboratory testing of mixtures comprising acetals and oleophilic alcohols and/or oleophilic esters as substitutes for mineral oils in inverted emulsion muds:
Mud formulation 245 ml of the mixture according to the invention of acetal, oleophilic alcohol and/or oleophilic ester are initially introduced into a Hamilton Beach (HB) mixer. The HB mixer is switched to the "high speed" setting. 8 g of ®Tixogel (hydrophobicized bentonite, manufacturer Südchemie), 9 g of anionic emulsifier (70% pure, dodecylbenzene sulfonate), 3 g of cationic emulsifier (85% pure, imidazoline type) and 10 g of CaO are added in portions. The mixture is stirred for 5 minutes. Thereafter, 105 ml of $CaCl_2$ solution (20% strength) are added in portions. After a further stirring time of 10 minutes, 275 g of barium sulfate (g=1.60 $g/cm^3$) are introduced, which increases the density of the mud to 1.46 $g/cm^3$. The entire mud is stirred again for 20 minutes. The rheology (at 50° C.) and the water loss (25° C.) of the mud are then measured. The electrical stability (ES) in volt is then determined with Fann model 23D before and after aging at 65.5° C. (18 hours).

Table 3 shows the rheology of inverted emulsion muds based on isobutyraldehyde di-2-ethylhexyl acetal and mixtures thereof with rapeseed oil at 50° C.

Table 4 shows the rheology of inverted emulsion muds based on dihexylformal and mixtures thereof with rapeseed oil at 50° C.

Table 5 shows the rheology of inverted emulsion muds based on isobutyraldehyde di-2-ethylhexyl acetal and mixtures thereof with coconut alcohol (technical grade) at 50° C.

Table 6 shows the rheology of inverted emulsion muds based on isobutyraldehyde di-2-ethylhexyl acetal and mixtures thereof with soya oil and α-methyldecanol at 50° C.

The values for the AV, PV, FL, gel strength after 10 seconds and gel strength after 10 minutes were determined in accordance with API Recommended Practice, Standard Procedure of Field Testing Water-Based & Drilling Fluids 13 B-1 (RP 13 B-1), Section 2, and the values for WL (water loss) were determined in accordance with the same standard, Section 3.

The Theological profiles of the inverted emulsion muds in Tables 3–5 based on mixtures of acetals and esters or alcohols show that they meet the use requirements for this type of mud.

Improved Theological profiles, ie. higher viscosities with a low shear rate, can sometimes be achieved with the mixtures, in relation to the pure acetals.

TABLE 1

| | Viscosity in mPas/20° C. | Setting point/°C. |
|---|---|---|
| Rapeseed oil | 72 | <−0 |
| Soya oil | 60 | <−10 |
| Coconut fatty alcohol (technical grade) | 28 | Already slight sediment under normal conditions |
| Lauryl alcohol (technical grade) | 22 | 15–18 |

TABLE 2

| Acetal | Ester or alcohol | Weight ratio | Viscosity in mPas/20° C. | Setting point/°C. |
|---|---|---|---|---|
| Acetaldehyde di-n-octyl acetal | rapeseed oil | 90/10 | 8 | <−10 |
| Acetaldehyde di-n-octyl acetal | rapeseed oil | 75/25 | 10 | <−10 |
| Acetaldehyde di-n-octyl acetal | rapeseed oil | 50/50 | 17 | <−10 |
| Acetaldehyde di-n-octyl acetal | soya oil | 90/10 | 7 | <−15 |
| Acetaldehyde di-n-octyl acetal | soya oil | 75/25 | 9 | <−10 |
| Acetaldehyde di-n-octyl acetal | soya oil | 50/50 | 16 | <−20 |
| Acetaldehyde di-n-octyl acetal | lauryl alcohol/ technical grade | 90/10 | 7 | <±0 |
| Acetaldehyde di-n-octyl acetal | lauryl alcohol/ technical grade | 75/25 | 8 | <+5 |
| Acetaldehyde di-n-octyl acetal | lauryl alcohol/ technical grade | 50/50 | 9 | <+10 |
| Acetaldehyde di-n-octyl acetal | α-methyldecanol | 90/10 | 7 | <−30 |
| Acetaldehyde di-n-octyl acetal | α-methyldecanol | 75/25 | 7 | <−20 |
| Acetaldehyde di-n-octyl acetal | α-methyldecanol | 50/50 | 9 | <+10 |

TABLE 2-continued

| Acetal | Ester or alcohol | Weight ratio | Viscosity in mPas/20° C. | Setting point/°C. |
|---|---|---|---|---|
| Dihexylformal | α-methyldecanol | 90/10 | 4 | <-25 |
| Dihexylformal | α-methyldecanol | 75/25 | 5 | <-20 |
| Dihexylformal | α-methyldecanol | 50/50 | 6 | <-15 |
| Isobutyraldehyde di-2-ethyl-hexyl acetyl | rapeseed oil | 90/10 | 9 | <-20 |
| Isobutyraldehyde di-2-ethyl-hexyl acetal | rapeseed oil | 75/25 | 13 | <-20 |
| Isobutyraldehyde di-2-ethyl-hexyl acetal | rapeseed oil | 50/50 | 22 | <-20 |
| Isobutyraldehyde di-2-ethyl-hexyl acetal | soya oil | 90/10 | 10 | <-20 |
| Isobutyraldehyde di-2-ethyl-hexyl acetal | soya oil | 75/25 | 13 | <-20 |
| Isobutyraldehyde di-2-ethyl-hexyl acetal | soya oil | 50/50 | 21 | <-20 |
| Isobutyraldehyde di-2-ethyl-hexyl acetal | lauryl alcohol/technical grade | 90/10 | 8 | <-5 |
| Isobutyraldehyde di-2-ethyl-hexyl acetal | lauryl alcohol/technical grade | 75/25 | 10 | <±0 |
| Isobutyraldehyde di-2-ethyl-hexyl acetal | lauryl alcohol/technical grade | 50/50 | 14 | <+5 |
| Isobutyraldehyde di-2-ethyl-hexyl acetal | coconut alcohol/technical grade | 90/10 | 8 | <-10 |
| Isobutyraldehyde di-2-ethyl-hexyl acetal | coconut alcohol/technical grade | 75/25 | 10 | <-5 |
| Isobutyraldehyde di-2-ethyl-hexyl acetal | coconut alcohol/technical grade | 50/50 | 14 | <±0 |
| Dihexylformal | rapeseed oil | 90/10 | 4 | <-20 |
| Dihexylformal | rapeseed oil | 75/25 | 6 | <-20 |
| Dihexylformal | rapeseed oil | 50/50 | 10 | <-20 |
| Dihexylformal | soya oil | 90/10 | 4 | <-20 |
| Dihexylformal | soya oil | 75/25 | 6 | <-20 |
| Dihexylformal | soya oil | 50/50 | 9 | <-20 |
| Dihexylformal | lauryl alcohol/technical grade | 90/10 | 3 | <-20 |
| Dihexylformal | lauryl alcohol/technical grade | 75/25 | 5 | <-15 |
| Dihexylformal | lauryl alcohol/technical grade | 50/50 | 7 | <-10 |

TABLE 3

| Products | 1 | 2 | 3 | 4 |
|---|---|---|---|---|
| Isobutyraldehyde di-2-ethylhexyl acetal | 100% | 90% | 75% | 50% |
| Rapeseed oil raff. A4 | 0% | 10% | 25% | 50% |
| ®Tixogel gb | 8 g | 8 g | 8 g | 8 g |
| ®Emulsogen OM 1 | 9 g | 9 g | 9 g | 9 g |
| ®Emulsogen OM 2 | 3 g | 3 g | 3 g | 3 g |
| CaO | 10 g | 10 g | 10 g | 10 g |
| CaCl$_2$ (20% strength) | 105 ml | 105 ml | 105 ml | 105 ml |
| Barite | 275 g | 275 g | 275 g | 275 g |

| Shear rate (1/sec) | Viscosity in mPas | mPas | mPas | mPas |
|---|---|---|---|---|
| 1022 | 36 | 50 | 86 | 64 |
| 511 | 42 | 63 | 125 | 78 |
| 340 | 45 | 75 | 162 | 87 |
| 170 | 51 | 111 | 255 | 108 |
| 102 | 60 | 155 | 365 | 120 |
| 51 | 80 | 240 | 620 | 190 |
| 10 | 175 | 800 | 2250 | 600 |
| 5 | 250 | 1400 | 4300 | 1100 |
| Apparent viscosity (mPas) | 36 | 50 | 86 | 64 |
| Plastic viscosity (mPas) | 30 | 37 | 47 | 50 |
| Flow limit (lbs/100 sq ft) | 12 | 26 | 78 | 28 |
| Gel strength after 10 sec/10 min (lbs/100 sq ft) | 2/5 | 12/27 | 37/89 | 11/20 |

®Emulsogen OM 1 Anionic emulsifier based on dodecylbenzene-sulfonate (manufacturer: Hoechst AG)
®Emulsogen OM 2 Cationic emulsifier of the imidazoline type (manufacturer: Hoechst AG)

TABLE 4

| Products | 1 | 2 | 3 | 4 |
|---|---|---|---|---|
| Dihexylformal | 100% | 90% | 75% | 50% |
| Rapeseed oil raff. A4 | 0% | 10% | 25% | 50% |
| ®Tixogel gb | 8 g | 8 g | 8 g | 8 g |
| ®Emulsogen OM 1 | 9 g | 9 g | 9 g | 9 |
| ®Emulsogen OM 2 | 3 g | 3 g | 3 g | 3 g |
| CaO | 10 g | 10 g | 10 g | 10 g |
| CaCl$_2$ (20% strength) | 105 ml | 105 ml | 105 ml | 105 ml |
| Barite | 275 g | 275 g | 275 g | 275 g |

| Shear rate (1/sec) | Viscosity in mPas | mPas | mPas | mPas |
|---|---|---|---|---|
| 1022 | 20 | 41 | 88 | 235 |

TABLE 4-continued

| | | | | |
|---|---|---|---|---|
| 511 | 28 | 60 | 145 | 350 |
| 340 | 33 | 76 | 194 | 417 |
| 170 | 45 | 117 | 315 | 570 |
| 102 | 55 | 170 | 460 | 780 |
| 51 | 80 | 280 | 800 | 1250 |
| 10 | 300 | 1050 | 3150 | 3250 |
| 5 | 400 | 2000 | 5700 | 5200 |
| Apparent viscosity (mPas) | 20 | 41 | 88 | 235 |
| Plastic viscosity (mPas) | 12 | 22 | 31 | 70 |
| Flow limit (lbs/100 sq ft) | 16 | 38 | 119 | 280 |
| Gel strength after 10 sec/10 min (lbs/100 sq ft) | 4/8 | 18/19 | 54/56 | 82/84 |

TABLE 5

| Products | 1 | 2 | 3 | 4 |
|---|---|---|---|---|
| Dihexyiformal | 100% | 90% | 75% | 50% |
| Rapeseed oil raff. A4 | 0% | 10% | 25% | 50% |
| ®Tixogel gb | 8 g | 8 g | 8 g | 8 g |
| ®Emulsogen OM 1 | 9 g | 9 g | 9 g | 9 |
| ®Emulsogen OM 2 | 3 g | 3 g | 3 g | 3 g |
| CaO | 10 g | 10 g | 10 g | 10 g |
| CaCl$_2$ (20% strength) | 105 ml | 105 ml | 105 ml | 105 ml |
| Barite | 275 g | 275 g | 275 g | 275 g |

| | Viscosity in | | | |
|---|---|---|---|---|
| Shear rate (1/sec) | mPas | mPas | mPas | mPas |
| 1022 | 36 | 36 | 73 | 121 |
| 511 | 42 | 44 | 105 | 172 |
| 340 | 45 | 49 | 132 | 207 |
| 170 | 51 | 66 | 201 | 288 |
| 102 | 60 | 85 | 280 | 370 |
| 51 | 80 | 120 | 450 | 550 |
| 10 | 175 | 350 | 1700 | 1700 |
| 5 | 250 | 500 | 3100 | 3000 |
| Apparent viscosity (mPas) | 36 | 36 | 73 | 121 |
| Plastic viscosity (mPas) | 30 | 28 | 41 | 70 |
| Flow limit (lbs/100 sq ft) | 12 | 16 | 64 | 102 |
| Gel strength after 10 sec/10 min (lbs/100 sq ft) | 2/4 | 6/9 | 29/29 | 28/30 |

TABLE 6

| Products | 1 | 2 | 3 | 4 |
|---|---|---|---|---|
| Isobutyraldehyde di-2-ethylhexyl acetal | 100% | 50% | 50% | 50% |
| Soya oil | 0% | 25% | 10% | |
| α-Methyldecanol | | 25% | 40% | 70% |
| ®Tixogel gb | 8 g | 8 g | 8 g | 8 g |
| ®Emulsogen OM 1 | 9 g | 9 g | 9 g | 9 g |
| ®Emulsogen OM 2 | 3 g | 3 g | 3 g | 3 g |
| CaO | 10 g | 10 g | 10 g | 10 g |
| CaCl$_2$ (20% strength) | 105 ml | 105 ml | 105 ml | 105 ml |
| Barite | 275 g | 275 g | 275 g | 275 g |

| | Viscosity in | | | |
|---|---|---|---|---|
| Shear rate (1/sec) | mPas | mPas | mpas | mPas |
| 1022 | 36 | 138 | 84 | 54 |
| 511 | 42 | 198 | 122 | 62 |
| 340 | 45 | 246 | 156 | 68 |
| 170 | 51 | 363 | 234 | 84 |
| 102 | 60 | 490 | 325 | 80 |
| 51 | 80 | 790 | 520 | 90 |
| 10 | 175 | 2800 | 1850 | 100 |
| 5 | 2S0 | 4900 | 3200 | 100 |
| Apparent viscosity (mPas) | 36 | i38 | 84 | 54 |
| Plastic viscosity (mPas) | 30 | 78 | 46 | 46 |
| Flow limit (lbs/100 sq ft) | 12 | 120 | 66 | 16 |
| Gel strength after 10 sec/10 min (lbs/100 sq ft) | 2/4 | 47/48 | 32/32 | 2/4 |

AV = Apparent viscosity (mPas)
PV = Plastic viscosity (mPas)
FL = Flow limit (lb/100 sq ft)

We claim:

1. A mixture comprising an acetal and an oleophilic alcohol and/or oleophilic ester which is suitable for the preparation of an inverted emulsion drilling mud or emulsion drilling mud, said mixture has an oil phase, wherein the viscosity of the oil phase does not exceed 30 mPas as measured at 20° C.

2. The mixture as claimed in claim 1, wherein said acetal is based on a monofunctional aldehyde having 1 to 25 carbon atoms and a monohydric alcohol having 1 to 25 carbon atoms.

3. The mixture as claimed in claim 1, wherein the acetal is based on a dialdehyde, and a monohydric alcohol having 1 to 25 carbon atoms.

4. The mixture as claimed in claim 1, wherein the oleophilic alcohol is selected from the group consisting of a linear alcohol, branched alcohol, unsaturated alcohol, branched unsaturated alcohol and mixtures thereof.

5. The mixture as claimed in claim 4, wherein the oleophilic alcohol has 8 to 25 carbon atoms.

6. The mixture as claimed in claim 4, wherein the oleophilic alcohol is a linear alcohol having 10 to 16 carbon atoms.

7. The mixture as claimed in claim 4, wherein the oleophilic ester is an ester based on a mono-, di- and/or trifunctional alcohol and a $C_1$–$C_{25}$-carboxylic acid.

8. The mixture as claimed in claim 7, wherein the oleophilic ester is selected from the group consisting of an oleophilic ester oil of vegetable origin and an oleophilic oil of animal origin.

9. An inverted emulsion drilling mud and/or emulsion drilling mud comprising the mixture as claimed in claim 1.

10. The inverted emulsion drilling mud and/or emulsion drilling mud as claimed in claim 9, wherein the viscosity of the oleophilic phase is from 10 mPas to 30 mPas and the setting point is below +10° C.

11. The inverted emulsion drilling mud as claimed in claim 10, wherein the oleophilic phase is at least 5% by weight of acetal, and not more than 95% by weight, of oleophilic alcohol and/or ester.

12. The emulsion drilling mud as claimed in claim 9 wherein not more than 50% by weight of the mixture is of an acetal and an oleophilic alcohol and/or oleophilic ester.

13. The mixture as claimed in claim 2, wherein said acetal is based on a monofunctional aldehyde having 1 to 10 carbon atoms in a monohydric alcohol having 4 to 20 carbon atoms.

14. The mixture as claimed in claim 3, wherein the acetal is based on a dialdehyde having 2 to 10 carbon atoms, and a monohydric alcohol having 4 to 20 carbon atoms.

15. The mixture as claimed in claim 14, wherein said dialdehyde is selected from the group consisting of glyoxal, tartaric acid dialdehyde, succinic dialdehyde and a mixture of maleic and fumaric acid dialdehyde.

16. The mixture as claimed in claim 15, wherein the dialdehyde is glyoxal.

17. The inverted emulsion drilling mud as claimed in claim 11, wherein the oleophilic phase is 5 to 99% by weight of acetal and 1 to 95% by weight is oleophilic alcohol and/or ester.

18. The mixture as claimed in claim 7, wherein the di-alcohol is an alcohol having from 2 to 18 carbon atoms or is in the form of polyglycol ether having up to 6 ethylene-alkaline, propylene alkaline or a mixture of ethylene alkaline and propylene alkaline.

19. The process of preparing an inverted emulsion drilling mud and/or an emulsion drilling mud comprising mixing an acetal and an oleophilic alcohol and/or oleophilic ester.

* * * * *